United States Patent
Hoopes (10) Patent No.: US 8,035,947 B2
(45) Date of Patent: Oct. 11, 2011

(54) CONTROLLED CONVECTION THERMAL DISCONNECTOR

(75) Inventor: Michael L. Hoopes, Novato, CA (US)

(73) Assignee: Panamax Corporation, Petaluma, CA (US)

( * ) Notice: Subject to any disclaimer, the term of this patent is extended or adjusted under 35 U.S.C. 154(b) by 344 days.

(21) Appl. No.: 12/434,530

(22) Filed: May 1, 2009

(65) Prior Publication Data
US 2009/0323244 A1 Dec. 31, 2009

Related U.S. Application Data

(60) Provisional application No. 61/076,549, filed on Jun. 27, 2008.

(51) Int. Cl.
*H02H 1/00* (2006.01)
(52) U.S. Cl. ......... 361/124; 361/103; 361/111; 361/115
(58) Field of Classification Search .................. 361/103, 361/111, 115, 117, 124, 125, 131; 337/28
See application file for complete search history.

(56) References Cited

U.S. PATENT DOCUMENTS

| | | | | |
|---|---|---|---|---|
| 2,704,315 A * | 3/1955 | Norden | | 218/22 |
| 3,936,703 A * | 2/1976 | Sakshaug | | 361/120 |
| 4,734,823 A * | 3/1988 | Cunningham | | 361/125 |
| 5,502,612 A * | 3/1996 | Osterhout et al. | | 361/117 |
| 5,844,761 A * | 12/1998 | Place, IV | | 361/104 |
| 5,909,349 A * | 6/1999 | Brower et al. | | 361/117 |
| 6,327,129 B1 * | 12/2001 | Oertel et al. | | 361/118 |
| 6,411,486 B1 * | 6/2002 | Doneghue | | 361/118 |
| 6,678,138 B2 * | 1/2004 | Glaser et al. | | 361/103 |
| 7,508,295 B2 * | 3/2009 | Graf et al. | | 337/159 |
| 7,616,420 B2 * | 11/2009 | Slater et al. | | 361/91.1 |
| 7,656,640 B2 * | 2/2010 | Domejean et al. | | 361/131 |
| RE42,319 E * | 5/2011 | Martenson et al. | | 361/124 |
| 2007/0290786 A1 * | 12/2007 | Chou et al. | | 338/21 |
| 2009/0103218 A1 * | 4/2009 | Ryan et al. | | 361/56 |

* cited by examiner

*Primary Examiner* — Rexford Barnie
*Assistant Examiner* — Christopher Clark
(74) *Attorney, Agent, or Firm* — DLA Piper LLP (US)

(57) ABSTRACT

A surge protection device employing a controlled convection thermal disconnector in which a surge protective component, such as a metal oxide varistor, and a thermally responsive device, such as a thermal cut-off, are placed in separate, cross-ventilated chambers. An internal vent is positioned such that it prevents line-of-sight between the surge protective component and a mechanized portion of the thermally responsive device, in order to protect the thermally responsive device from hot surge protective component emissions from the surge protective component. An output vent is formed between the thermally responsive device and the exterior atmosphere to promote forced convective heat transfer from the surge protective component to the thermally responsive device during a thermal runaway condition, with the expanding gases in the surge protective component chamber providing the transfer impetus.

10 Claims, 10 Drawing Sheets

CONTROLLED CONVECTION THERMAL DISCONNECTOR

CROSS REFERENCE TO RELATED APPLICATIONS

This application claims the benefit of U.S. provisional application No. 61/076,549, filed on Jun. 27, 2008, which is incorporated herein by reference.

BACKGROUND OF THE INVENTION

1. Field of the Invention

The present invention relates to surge protection devices employing thermally responsive devices.

2. Description of Related Art

Thermally responsive devices are often employed to electrically disconnect surge protective components that are experiencing thermal runaway. They are generally placed in close proximity to the component, and trip permanently when a sufficient amount of heat is transferred to the thermal sensing mechanism to bring it to a predetermined temperature threshold. Commonly used thermally responsive devices include thermal cut-offs (TCOs) and bimetallic trip actuators and, less commonly, shape memory alloy (SMA) trip actuators.

TCOs generally take one of two different forms: eutectic and chemical pellet. A eutectic TCO depends on a conductive fusible alloy link with a very abrupt phase change characteristic as it reaches its melting point. A chemical pellet TCO uses a material with eutectic properties to actuate a spring-loaded contact mechanism, and generally has higher operating current ratings than eutectic TCOs (15-25 versus 4-7 Amperes at 120 Vac).

Commonly used surge protective components are placed across electrical poles to limit the interterminal voltage, and include metal oxide varistors (MOVs), silicon avalanche diodes (SADs), gas discharge tubes (GDTs), and thyristor surge protectors. A varistor (MOV), for example, is used to dissipate high-energy power surges by converting excess electrical energy into heat.

MOVs and TCOs are currently the most popular combination in the surge protective device (SPD) industry. The ZnO in an MOV has a melting point significantly higher than Cu (1975° C. vs. 1085° C.). Cu is the primary casing material for chemical pellet TCOs. If a surge has enough energy, it can cause a varistor (MOV) to heat up enough to eject conductive plasma that can cause damage to the surrounding area and additional shorting. That is, An MOV, in response to sustained voltages well in excess of its rated value, can eject hot material (plasma) at high velocity, due to extreme hot spots caused by localized, self-promoting breakdown of granular diode junctions. A direct strike of ZnO plasma to a chemical pellet TCO's casing can cause it to lose its ability to actuate. Likewise, the brass material in a bimetallic circuit breaker conductor and Nitinol SE508 shape memory alloy are also vulnerable in this application, with respective melting points of 900-940° C. and 1310° C.

The primary means of heat transfer in the prior art is through conduction and radiation. Conduction transports heat through conductors in the wiring assembly, and infrared radiation and/or conduction transports heat in the air space or potting compound existing between the components. In a conducted/radiated heat transfer scenario, relative proximity and orientation of the MOV hot spot to the TCO are major factors, and are difficult to control.

In addition, the proximity requirement for conduction/radiation commonly forces a compromise between disconnector safe operation and response time. The chemical pellet TCO needs an insulating barrier to protect it from MOV plasma, which compromises conducted/radiated heat transfer, thus slowing its response to the thermal runaway condition.

ANSI/UL 1449-2006 (Surge Protective Devices) requires abnormal overvoltage testing of these devices for various levels of available supply current to simulate the probable range of thermal runaway scenarios. Most protectors fall into the UL 1449 "Type 3", or "point of utilization" category, where they are utilized downstream of 120 Vac/15 A branch circuits. UL assigns the following test currents to this category:

1. Limited Current Test. Four levels: 5, 2.5, 0.5 and 0.125 Amperes. These tests are relatively benign when using thermal disconnector coupling as seen in the prior art.

2. Intermediate Current Test. Three levels: 50, 150 and 1000 Amperes. The first two represent especially difficult conditions for thermal disconnectors utilizing conducted/radiated heat transfer. Using the aforementioned method, the disconnect operation is not fast enough to prevent MOV emissions from creating arc paths that bypass the TCO. Arcing in this scenario is self-promoting; as the MOV continues to conduct through these alternate arc paths, it liberates combusted materials from adjacent insulating materials and PCB laminate into the surrounding environment. The two most likely failure modes in this case are excessive ground leakage, due to contaminate deposited on the wiring assembly, and fire.

A supplementary fuse is often used in series with the MOV to speed the disconnecting operation for the intermediate current conditions. That is, a thermal fuse may be used in conjunction with the varistor (MOV) to break the electrical current to the MOV once the temperature of the MOV gets to a certain temperature. However, there are challenges in ensuring that the thermal fuse will open at the appropriate time and will not be shorted out by plasma ejected by the MOV.

Figure 1:
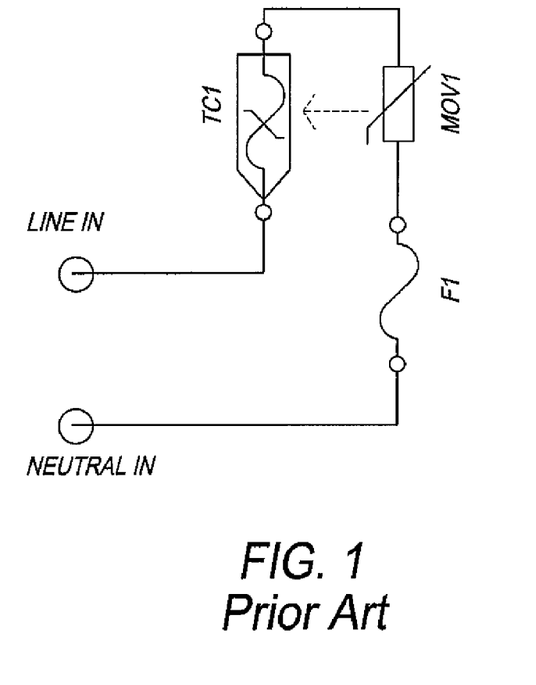
FIG. 1 is a schematic diagram of a standard fuse-assisted pellet TCO 1-port SPD.
Figure 2:
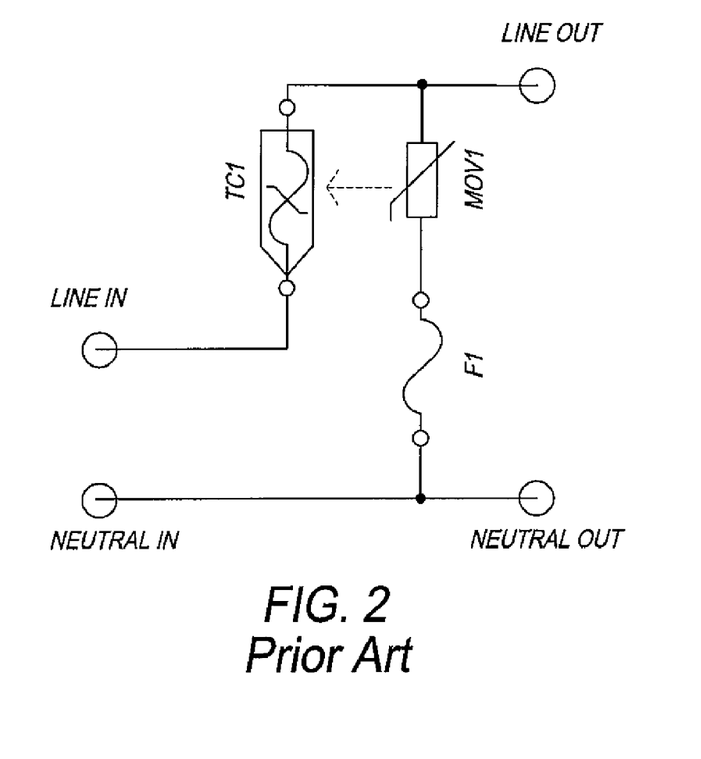
FIG. 2 is a schematic diagram of a standard fuse-assisted pellet TCO 2-port SPD.

A standard, fuse-assisted pellet TCO 1-port SPD is illustrated in FIG. 1, and a standard fuse-assisted pellet TCO 2-port SPD is illustrated in FIG. 2. As can be seen, a fuse F1 is placed in series with the MOV. Current-limiting fuses can carry the load and surge current, but are very expensive if well matched with a modern MOV. A typical part used in this scenario could be a 7-Ampere time delay fuse, which is generally rated too low to be placed in series with the load, and compromises surge capacity. This is a disadvantage for two-port SPDs.

Figure 3:
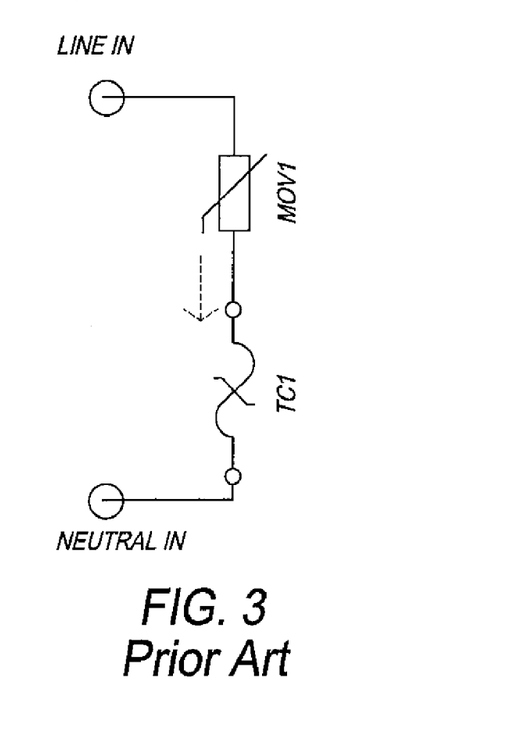
FIG. 3 is a schematic diagram of a standard eutectic TCO 1-port SPD.
Figure 4:
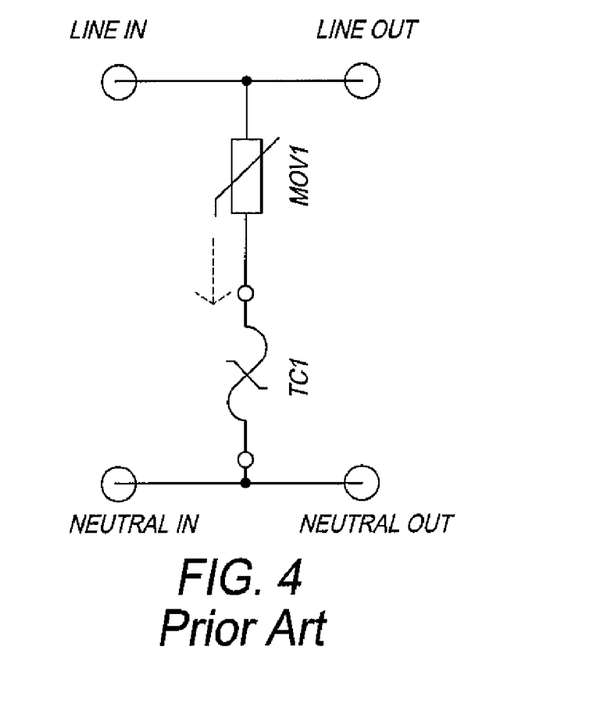
FIG. 4 is a schematic diagram of a standard eutectic TCO 2-port SPD.

The eutectic TCO has a safety advantage in that the alloy link effectively combines overcurrent fusing with an electrical connection that is inherently un-weldable, unlike the pellet version's mechanical contact configuration. This makes it very effective in clearing the intermediate fault currents. It cannot be welded by a plasma strike, overvoltage fault or surge current. However, the pellet versions generally can handle more load and surge current without opening, and are more often placed in series with the equipment load than the eutectic versions. In this regard, a standard eutectic TCO 1-port SPD is illustrated in FIG. 3, and a standard eutectic TCO 2-port SPD is illustrated in FIG. 4.

Both of these scenarios yield the same result: in the event of an intermediate-level overvoltage fault or large surge current, the protection will be disconnected, leaving the equipment load unprotected. The pellet TCO can disconnect the load for more minor faults, but is compromised by the need for auxiliary fusing and insulating barriers. The eutectic version can only disconnect the protection.

Solutions currently available in the industry tend to leave one or more of these issues unaddressed:

1. The most common method is to place the MOV in close proximity to the TCO, and wrap insulating tape around the component assembly. This serves to keep the parts close together and to prevent some of the heat from escaping quickly into the environment. This is very effective for limited-current situations, but offers little control over the materials emitted from the MOVs when shunting the intermediate currents. The MOV plasma will breach the tape in short order.

2. An improvement over the first method is to replace the insulating tape with a fire-resistant pouch, which more effectively contains the heat and MOV emissions. However, the MOV materials emitted during intermediate current conditions often compromise most flexible insulators, which can provide additional fuel to the fire.

3. Thermally-protected MOVs integrate a low-temperature solder link between one of the leads and the MOV disk. Littelfuse, Inc. offers a version called the "TMOV", for example. They are reasonably effective at coupling the heat to the thermally responsive device, but cannot carry typical equipment load currents, and require assistance from an external fuse for the intermediate current tests. They are also more expensive than MOV/thermal cut-off combinations where multiple MOVs are thermally coupled to a single discrete TCO, which is a more typical situation in the field. US 2007/0200657 is directed to a thermally protected MOV with a built-in overcurrent fuse that may address the intermediate current issue, but does not appear to be rated to carry or interrupt typical equipment load currents.

4. Ceramic box-encased MOV assemblies place one or more MOVs inside a fire-resistant, sealed enclosure, with air or potting compound (such as silica or a thermosetting resin) used as fill. The MOVs may have a ceramic coating. This configuration is effective at containing the arc-promoting residues emitted by the MOVs during thermal runaway. A version of this is the "X3" produced by Energetic Technology Co., with three ceramic-coated MOVs placed in free air inside a ceramic enclosure. The TCOs are located outside the box. Because ceramic materials are such good thermal insulators, and because the MOV hot spot locations are extremely difficult to predict, the entire box would have to come up to a temperature sufficient to radiate enough heat to trip the external TCO(s), which takes additional time. US 2007/0290786 is directed to such a device, including an improvement for thermal coupling using an additional enclosure and TCO mounting features, but only partially mitigates the thermal time response issue.

5. Ferraz Shawmut Inc. produces another enclosed MOV assembly called the "TPMOV". It integrates a spring-loaded "arc shield", which is held in place by one of the MOV electrodes. A conductive fusible alloy alloy bonds the electrode to a flat lead; when the alloy melts due to thermal stress, the "arc shield" slides between the lead and the electrode, and effectively quenches the arc. This configuration has excellent response time and fault current capacity. This part was designed for primary power applications (located at the service entrance panel). However, they do not have a version priced suitably for the majority of point-of-utilization SPDs, and the present configuration does not directly disconnect the load.

SUMMARY OF THE INVENTION

The present invention addresses these problems and provides a new method and apparatus in which heat from a surge protective component such as a metal oxide varistor (MOV) is contained to trigger an adjacent thermally responsive device such as a thermal cut-off (TCO).

In particular, the present invention provides a controlled convection thermal disconnector (CCTD) in which a thermally responsive device and a surge protective component are placed in separate, cross-ventilated chambers, with an output vent between the thermally responsive device and the exterior atmosphere. This promotes forced convective heat transfer from the surge protective component to the thermally responsive device during a thermal runaway condition, with the expanding gases in the surge protective component chamber providing the transfer impetus.

The internal vent is positioned such that it prevents line-of-sight between the surge protective component and the mechanized portion of the thermally responsive device. This protects the thermally responsive device from the hot surge protective component emissions (MOV plasma, for example), which will strike another surface before reaching the actuating element of the thermally responsive device. The chamber enclosure material is made from a highly flame-resistant material, such as phenolic or ceramic.

Other features and advantages of the invention will be apparent from the following detailed description, taken in conjunction with the accompanying drawings that illustrate, by way of example, various features of embodiments of the invention.

DETAILED DESCRIPTION OF THE INVENTION

The present invention provides a controlled convection thermal disconnector (CCTD) in which a thermally responsive device and surge protective component are placed in separate, cross-ventilated chambers, with an output vent between the thermally responsive device and the exterior atmosphere. This promotes forced convective heat transfer from the surge protective component to the thermally responsive device during a thermal runaway condition, with the expanding gases in the surge protective component chamber providing the transfer impetus.

The internal vent is positioned such that it prevents line-of-sight between the surge protective component and the mechanized portion of the thermally responsive device. This protects the thermally responsive device from the hot surge protective component emissions (MOV plasma, for example), which will strike another surface before reaching the actuating element of the thermally responsive device. The chamber enclosure material is made from a highly flame-resistant material, such as phenolic or ceramic.

Figure 5:
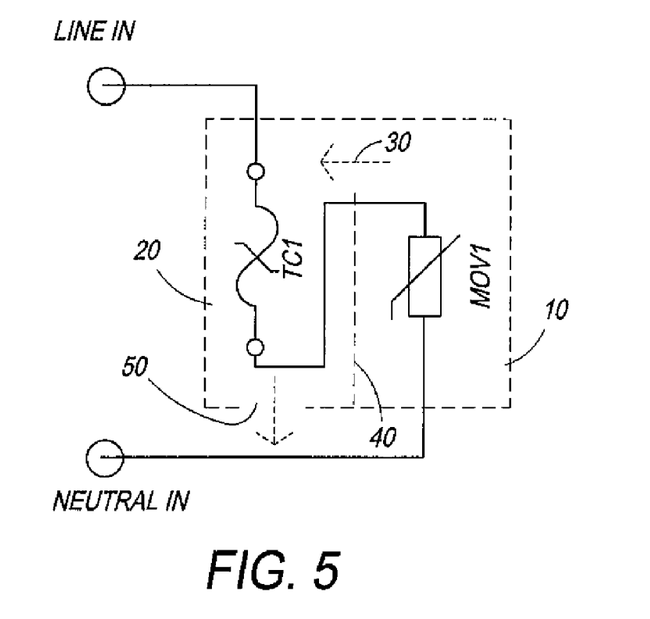
FIG. 5 is a schematic diagram of a CCTD eutectic TCO 1-port SPD according to the present invention.
Figure 6:
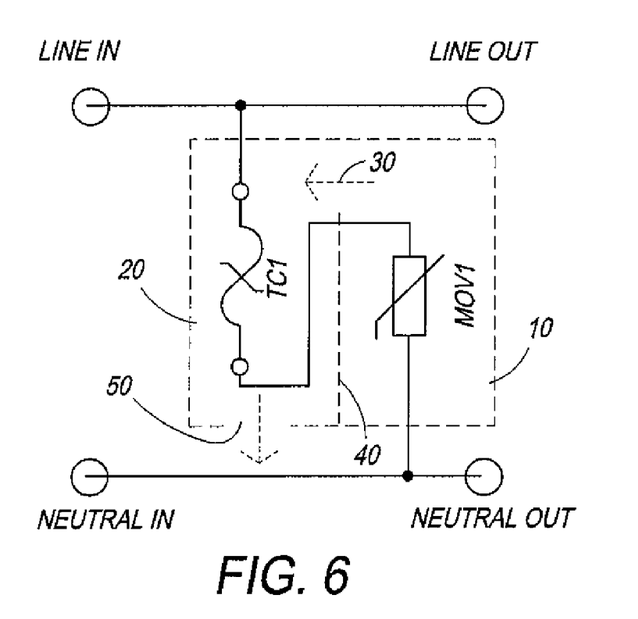
FIG. 6 is a schematic diagram of a CCTD eutectic TCO 2-port SPD according to the present invention.
Figure 7:
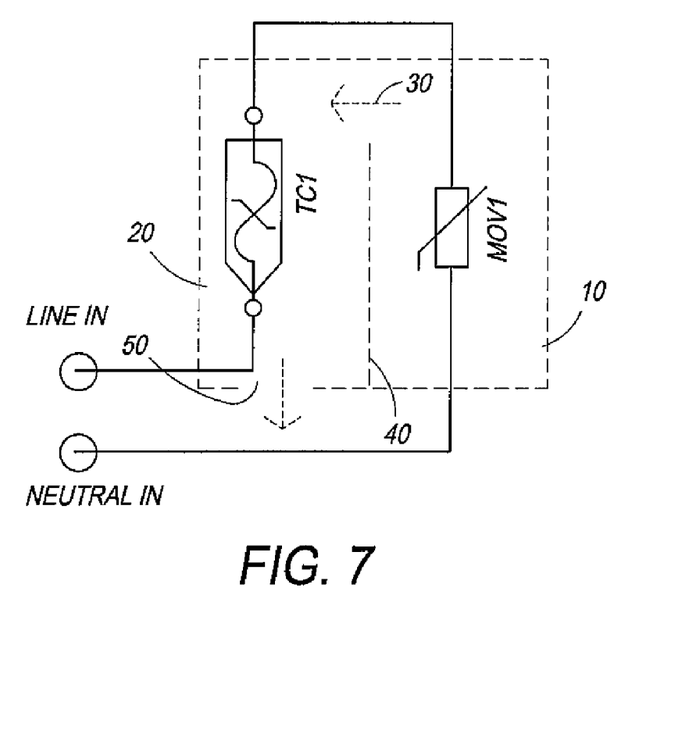
FIG. 7 is a schematic diagram of a CCTD pellet TCO 1-port SPD according to the present invention.
Figure 8:
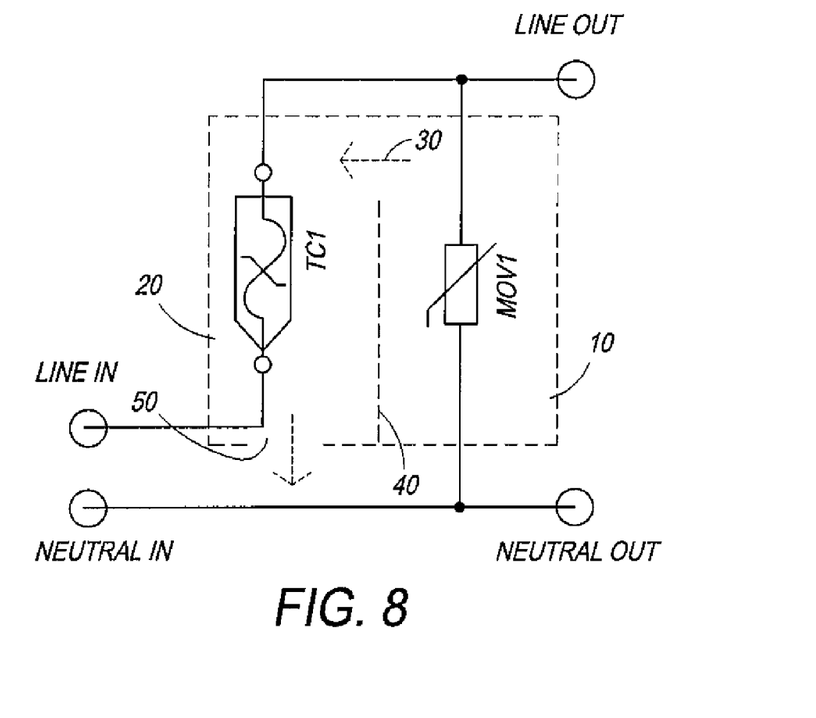
FIG. 8 is a schematic diagram of a CCTD pellet TCO 1-port SPD according to the present invention.

FIGS. 5-8 illustrated controlled convection thermal disconnector (CCTD) surge protection devices (SPDs) according to the present invention. FIG. 5 is a CCTD eutectic TCO 1-port SPD. FIG. 6 is a CCTD eutectic TCO 2-port SPD. FIG. 7 is a CCTD pellet TCO 1-port SPD. FIG. 8 is a CCTD pellet TCO 1-port SPD.

As illustrated in FIGS. 5-8, a surge protective component MOV1 and a thermally responsive device TC1 are placed, respectively, in separate chambers 10 and 20. Chambers 10 and 20 are connected by an internal vent 30 to provide cross-ventilation as indicated by the arrow. Internal vent 30 is positioned such that it prevents line-of-sight between surge protective component MOV1 and the mechanized portion of thermally responsive device TC1. That is, a barrier 40 is positioned in the line-of-sight between MOV1 and TC1. In this manner, thermally responsive device TC1 is protected from hot surge protective component emissions from surge protective component MOV1 (MOV plasma, for example). Such emissions will strike another surface (i.e., barrier 40) before reaching the actuating element of thermally responsive device TC1. In addition, chamber 20 containing thermally responsive device TC1 has an output vent 50 to the external atmosphere.

Several additional non-restrictive embodiments of the invention are illustrated in FIGS. 9-15 and demonstrate advantages and features provided by this invention.

Figure 9:
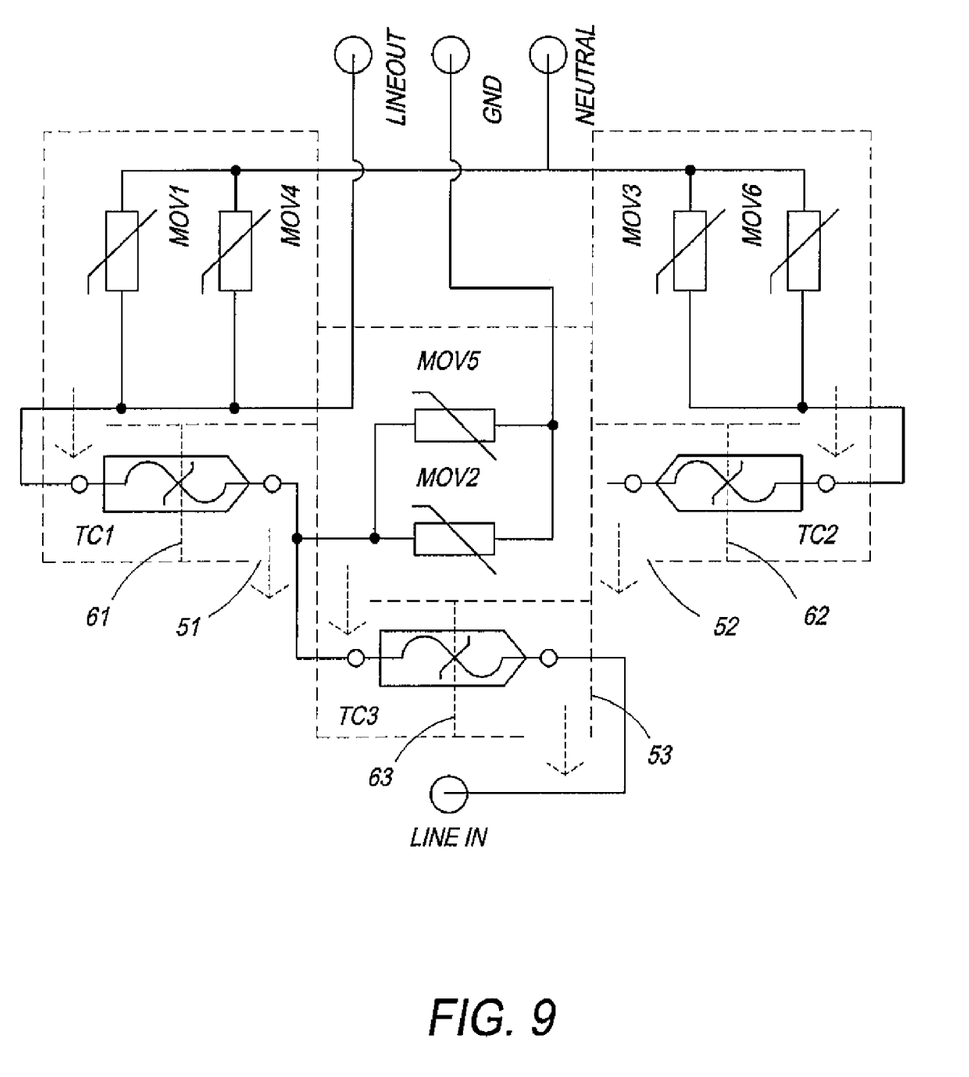
FIG. 9 is a schematic diagram of a 2-port receptacle-type SPD with 3-TCO CCTD according to the present invention.
Figure 10A:
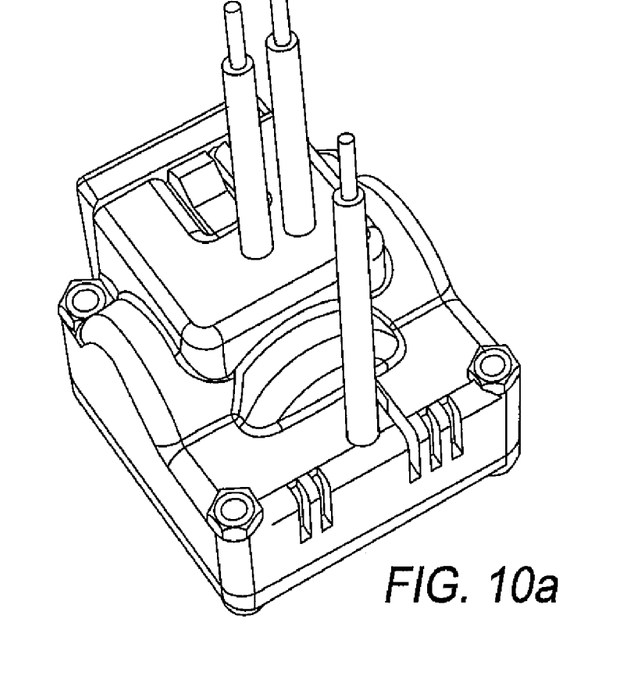
FIGS. 10a and 10b are perspective views of enclosures for the 2-port receptacle-type SPD with 3-TCO CCTD of FIG. 9.
Figure 10B:
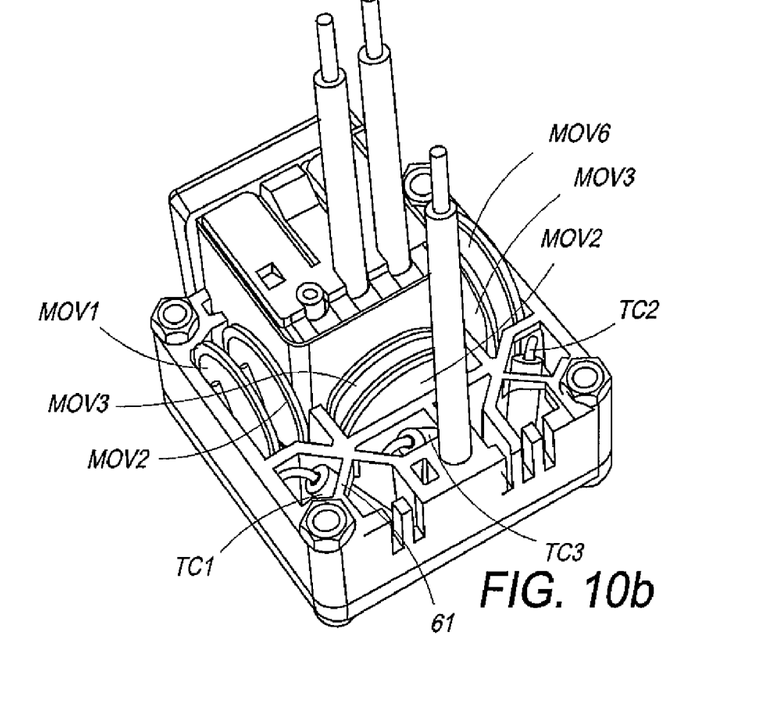

In one embodiment, as illustrated in FIG. 9, 2 a partial barrier (61, 62, 63) is added between the sensing portion of the thermally responsive device (TC1, TC2, TC3) and the output vent (51, 52, 53) to promote turbulence (thus reducing laminar boundary layer effects) and heated mass dwell time in the location of the thermally responsive device. FIG. 9 illustrates a 2-port receptacle-type SPD with 3-TCO CCTD. Thus, FIG. 9 provides an example of CCTD with multiple surge protective components (MOV1-MOV6) and thermally responsive devices (TC1-TC3), with each thermally responsive device being located in a separate chamber from adjacent MOVs, and an internal vent therebetween. In FIG. 9, the chemical pellet is located upstream of the partial barrier. FIGS. 10a and 10b are perspective views of the SPD of FIG. 9 and its enclosure.

Figure 11:
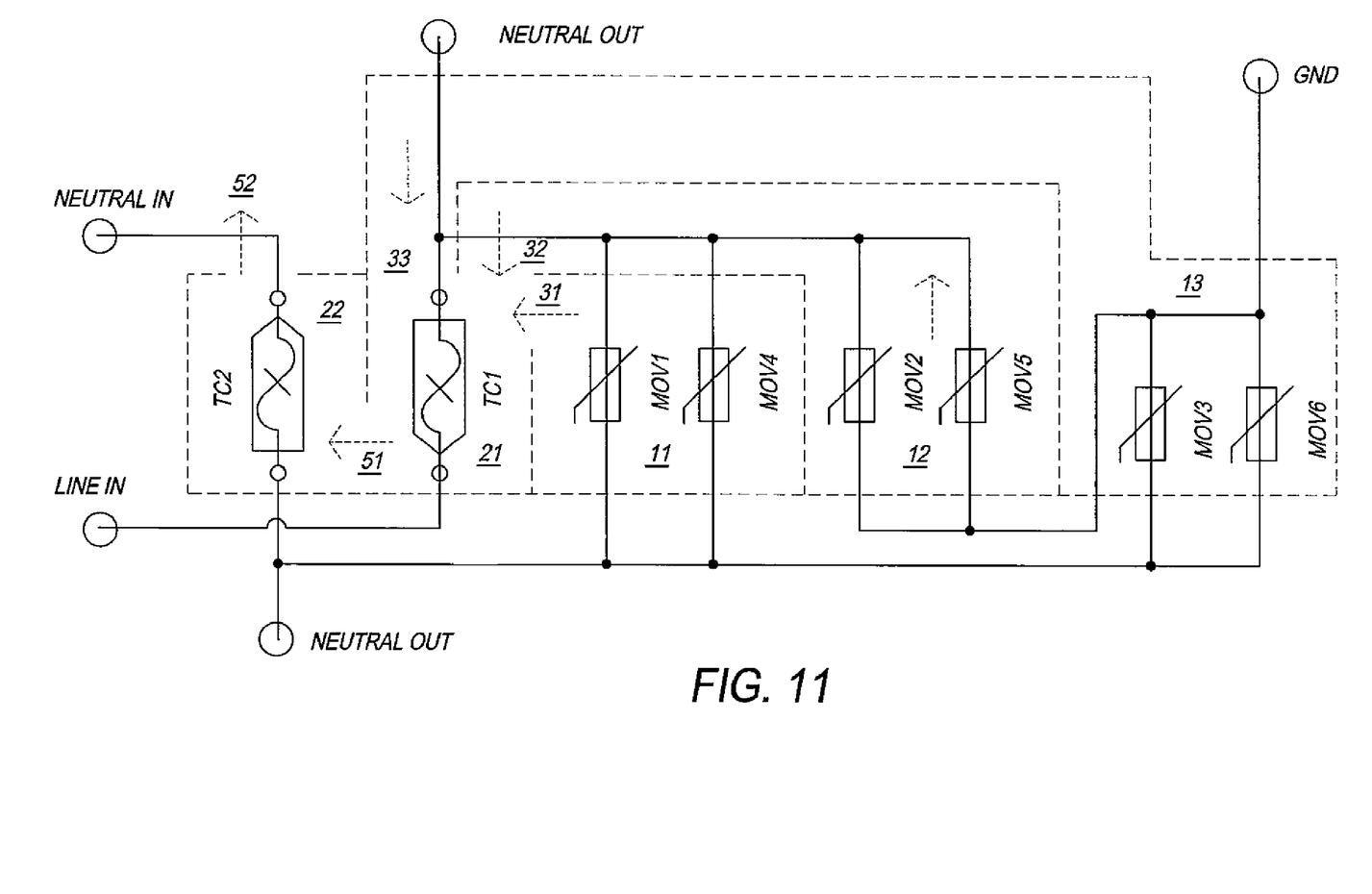
FIG. 11 is a schematic diagram of a CCTD series trip 2-TCO/2-port SPD according to the present invention.
Figure 12:
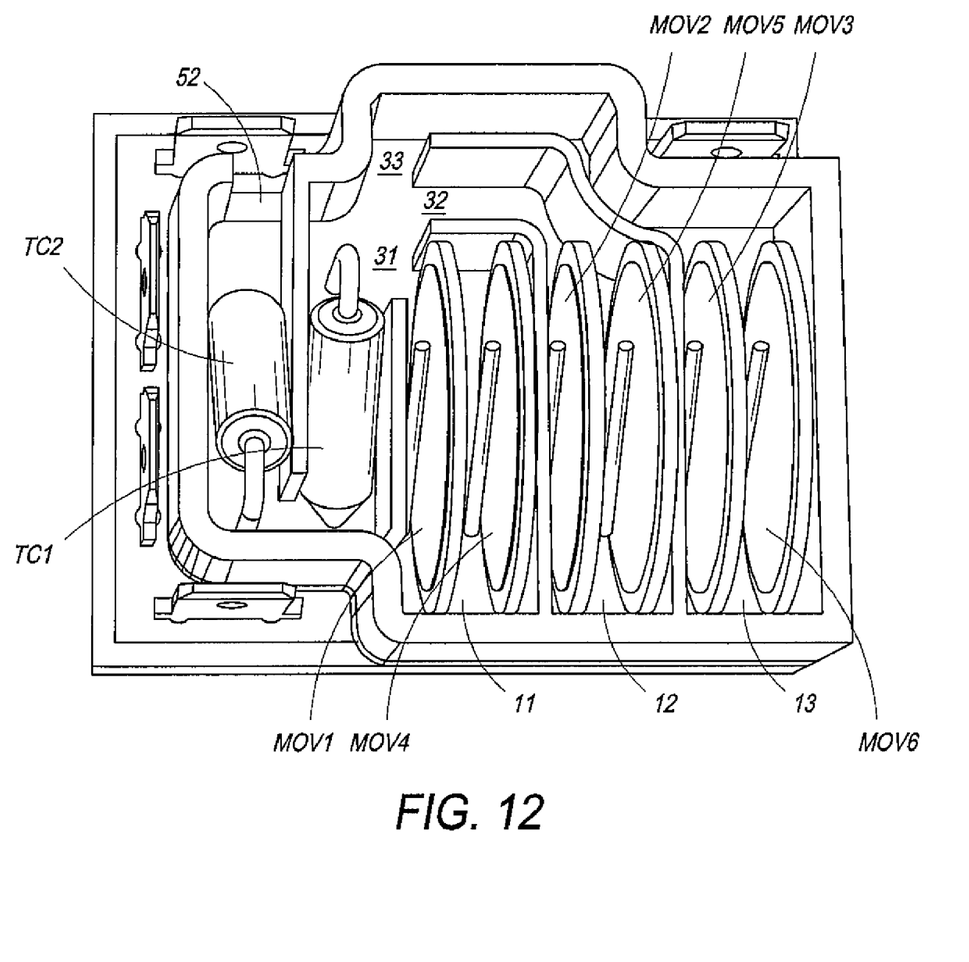
FIG. 12 is a perspective view of the CCTD series trip 2-TCO/2-port SPD of FIG. 11 with its top removed.

In another embodiment, as seen in FIGS. 11 and 12, the TCOs are configured in a series convective path, with converging internal vents. That is, MOV1 and MOV4 are contained in a chamber 11 having an internal vent 31 with chamber 21 housing TC1; MOV2 and MOV5 are contained in a chamber 12 with an internal vent 32 with chamber 21 housing TG1; and MOV3 and MOV6 are contained in a chamber 13 with an internal vent 33 with chamber 21. Thus, vents 31, 32 and 33 from the MOV chambers all converge on chamber 21 housing TC1.

In turn, thermal cut-off TC2 is housed in a chamber 22, having a vent 51 between it and chamber 21 housing TC1. Chamber 22 also has an external vent 52 to the outside. This enables a double-pole-like disconnect mode by aggregating the heat from all of the MOVs to a single path that can trip both TCOs. Because the TCO connecting the line (TC1) is located upstream of the TCO connecting the neutral (TC2) along the convective path, it can reliably be made to trip first.

In another embodiment, uninsulated, ceramic- or phenolic-insulated surge protection components are used to reduce the amount of arc- and leakage-promoting combusted organic polymers that are liberated from traditional coatings (usually epoxy) during thermal runaway conditions.

Figure 13:
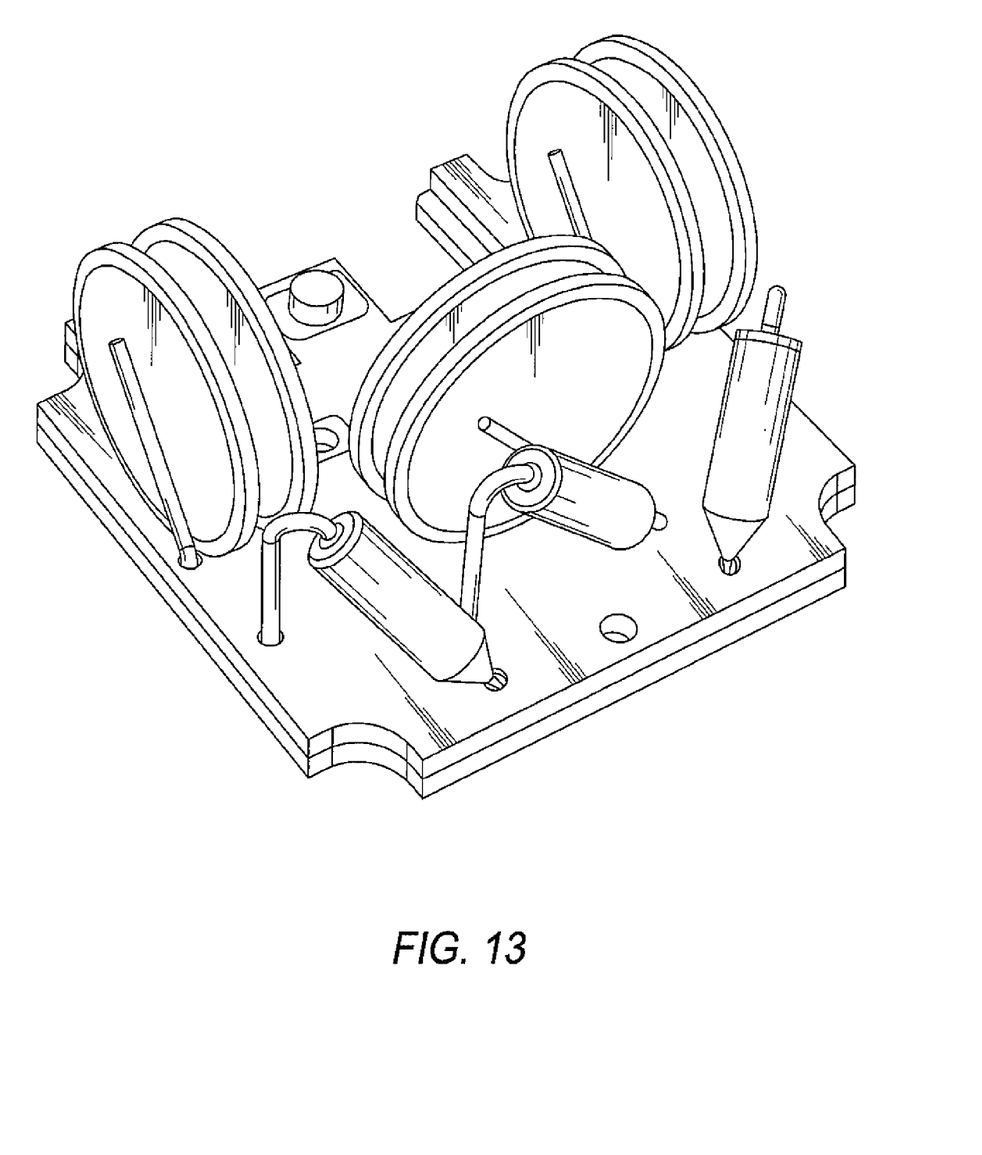
FIG. 13 is a perspective view of a PCB insulator for a 3-TCO CCTD according to the present invention.
Figure 14:
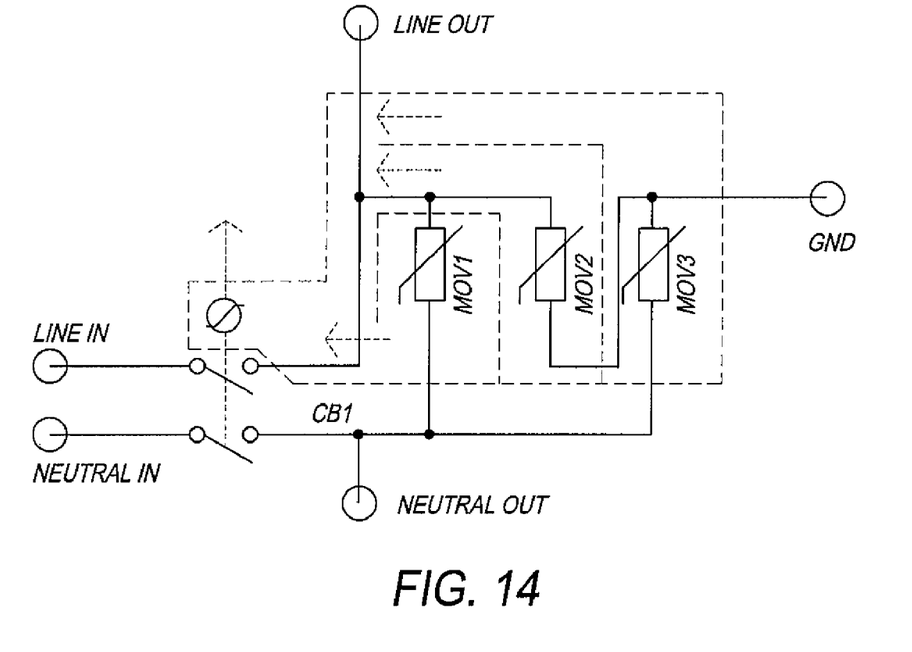
FIG. 14 is a schematic diagram of a 2-port CCTD circuit breaker according to the present invention.

In another embodiment, as depicted in FIG. 13, a flame-resistant electrical insulator is used between the surge protective/thermally responsive component assembly and the wiring assembly. This will help prevent the emitted materials from causing damage to PCB solder mask, creating conductive leakage paths to earth ground, or promoting arcing between opposite electrical poles.

Figure 15:
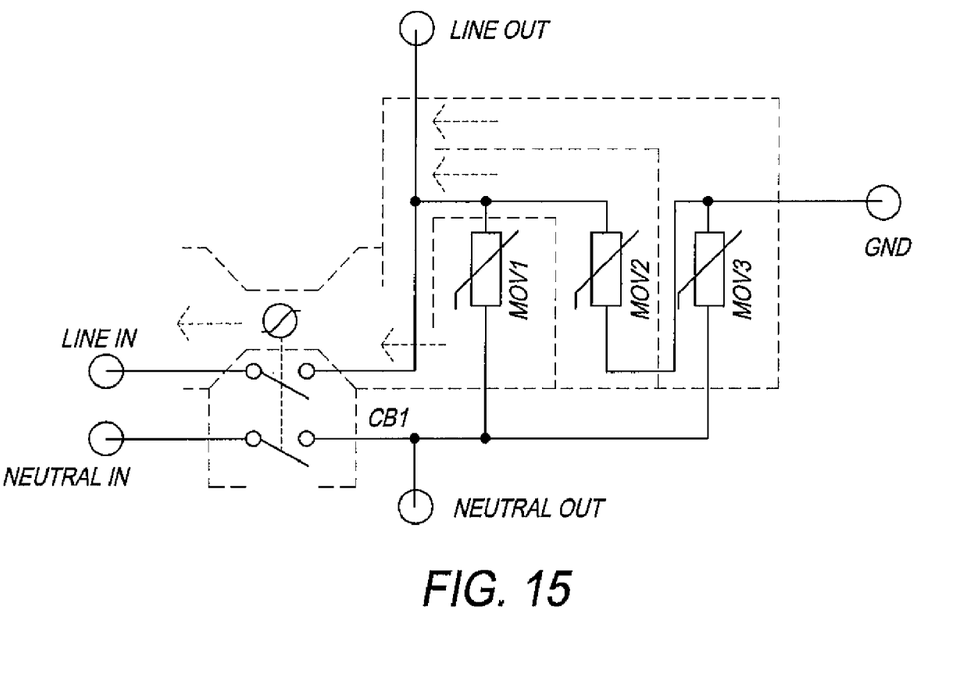
FIG. 15 is a schematic diagram of a 2-port CCTD Venturi-assisted circuit breaker according to the present invention.

In another embodiment (FIG. 14), an additional internal vent is added between the thermally responsive device chamber and upstream electrical contacts, an intake vent is added between the contacts and exterior atmosphere, and the cross-sectional area of the chamber is reduced at the location of the additional internal vent. This forms an inspirator; arcing gases are drawn away from the contacts by virtue of the Venturi Effect, aiding in arc quenching (FIG. 15).

In another embodiment, electrical sensor leads are added to the output of the disconnector to provide a failure indication function.

In another embodiment, the source side of the TCO (the end with the insulating epoxy that isolates the body from the input wire) is embedded in an extended portion of the PCB insulator from FIG. 13 to prevent MOV-emitted residue build-up from creating an electrical leakage path over the TCO insulating epoxy.

In another embodiment, the output vent is configured with a serpentine pathway or series of displaced partial walls or surface ribs for the express purpose of increasing vent pathway surface area. This will help to trap conductive residues carried by the expanding MOV gases, and to cool said gases before they enter the exterior environment.

The present invention is applicable not only to the specific embodiments described above, but to a variety of similar scenarios. It is of particular interest in applications where thermal runaway produces heat from multiple or unpredictably located component hot spots, and requires a quick disconnecting response to produce a safe failure mode.

While particular embodiments of the invention have been described, it should be understood that these embodiments are exemplary, and not restrictive. Various modifications will be apparent to those of skill in the art and are within the scope of the present invention as set forth in the following claims.

The invention claimed is:
1. A surge protection device comprising:
   a surge protective component contained in a first chamber;
   a thermally responsive device that is electrically connected to the surge protective component and that is contained in a second chamber;
   an internal vent connecting the first and second chambers; and
   an output vent formed between the second chamber and an external atmosphere.

2. A surge protection device as claimed in claim 1, wherein the surge protective component is a metal oxide varistor.

3. A surge protection device as claimed in claim 1, wherein the thermally responsive device is a thermal cut-off.

4. A surge protection device as claimed in claim 1, wherein the internal vent is positioned out of the line-of-sight between the surge protective component and the thermally responsive device.

5. A surge protection device as claimed in claim 4, wherein a barrier is formed in the line-of-sight between the surge protective component and the thermally responsive device to protect the thermally responsive device from emissions from the surge protective component.

6. A surge protection device as claimed in claim 1, where the first and second chambers are made from a highly flame-resistant material.

7. A surge protection device as claimed in claim 6, wherein the highly flame-resistant material is phenolic or ceramic.

8. A surge protection device as claimed in claim 1, and further comprising a partial barrier between a sensing portion of the thermally responsive device and the output vent.

9. A controlled convection thermal disconnector comprising:
a surge protective component contained in a first chamber made of a highly flame-resistant material;
a thermally responsive device that is electrically connected to the surge protective component and that is contained in a second chamber made of a, highly flame-resistant material;
an internal vent connecting the first and second chambers and that is positioned out of the line-of-sight between the surge protective component and the thermally responsive device;
a barrier formed in the line-of-sight between the surge protective component and the thermally responsive device to protect the thermally responsive device from emissions from the surge protective component; and
an output vent formed between the second chamber and an external atmosphere.

10. A controlled convection thermal disconnector as claimed in claim 9, wherein the surge protection component is a metal oxide varistor and the thermally responsive device is a thermal cut-off.

* * * * *